US011002316B2

(12) United States Patent
Bristow et al.

(10) Patent No.: US 11,002,316 B2
(45) Date of Patent: May 11, 2021

(54) SPINNER COLLAR

(71) Applicant: FLICC, LLC, Ladera Ranch, CA (US)

(72) Inventors: Charles Bristow, Ladera Ranch, CA (US); Marcos F. Reyes, Ladera Ranch, CA (US)

(*) Notice: Subject to any disclaimer, the term of this patent is extended or adjusted under 35 U.S.C. 154(b) by 0 days.

(21) Appl. No.: 16/007,887

(22) Filed: Jun. 13, 2018

(65) Prior Publication Data

US 2019/0101160 A1 Apr. 4, 2019

Related U.S. Application Data

(60) Provisional application No. 62/567,656, filed on Oct. 3, 2017.

(51) Int. Cl.
F16C 35/063 (2006.01)
F16C 23/06 (2006.01)
F23Q 2/32 (2006.01)
A63H 1/00 (2019.01)

(52) U.S. Cl.
CPC ............ F16C 35/063 (2013.01); A63H 1/00 (2013.01); F16C 23/06 (2013.01); F23Q 2/32 (2013.01)

(58) Field of Classification Search
CPC ... A63H 1/00; A63H 1/10; A63H 1/20; A63H 1/30; A63H 1/32; A63F 7/382; A63F 2250/485; F16C 35/063; F16C 23/06
USPC .......................... 446/236, 247, 250, 264, 266
See application file for complete search history.

(56) References Cited

U.S. PATENT DOCUMENTS 2,507,570 A    5/1950  Jensen
2,574,398 A *  11/1951 Krebeck ................. A63F 5/04
                                              273/141 R
3,287,846 A *  11/1966 Frangos .................... A63H 1/00
                                              446/235
3,402,984 A *  9/1968  Zazzara .................. B43L 15/00
                                              401/8
3,533,185 A *  10/1970 Kanbar .................... A63B 23/16
                                              446/266
3,959,989 A *  6/1976  Bhandia .................... A44C 9/02
                                              63/15.65
4,356,660 A    11/1982 O'Brien
4,685,859 A *  8/1987  Marshall, Jr. ............. B62B 3/00
                                              269/287
D303,159 S *   8/1989  Heath ......................... D27/172
5,088,684 A *  2/1992  Torras ....................... A24F 15/18
                                              206/87
5,115,590 A *  5/1992  Larson .................... A01K 97/12
                                              43/17

(Continued)

FOREIGN PATENT DOCUMENTS

KR    200483621    6/2017

OTHER PUBLICATIONS

International Search Report and Written Opinion from IA No. PCT/US2018/054232 dated Jan. 14, 2019.

Primary Examiner — Joseph B Baldori
(74) Attorney, Agent, or Firm — Klein, O'Neill & Singh, LLP

(57) ABSTRACT

A spinner collar engages any suitable device to enable the device to spin about the bearing axis of the spinner collar. A device such as a lighter with a long axis is engaged about the long axis by the spinner collar such that the bearing axis of the spinner collar is perpendicular to the long axis of the lighter enabling rotation of the long axis of the lighter about the bearing axis of the spinner collar.

13 Claims, 5 Drawing Sheets

(56) References Cited

U.S. PATENT DOCUMENTS

| | | | |
|---|---|---|---|
| 5,591,062 A | 1/1997 | Hettinger | |
| 5,944,433 A * | 8/1999 | O'Mara | B43K 23/008 401/7 |
| 6,430,782 B1 * | 8/2002 | Torres | A24F 15/18 206/87 |
| 6,926,274 B1 * | 8/2005 | Portella | A63F 3/00261 273/141 R |
| 7,044,827 B1 * | 5/2006 | Krull | A63B 23/16 446/491 |
| 7,507,198 B2 * | 3/2009 | Ardizzone | A61N 2/12 600/9 |
| 7,874,890 B2 * | 1/2011 | Van Dan Elzen | A63H 1/30 446/247 |
| D680,262 S * | 4/2013 | Mansfield | D27/161 |
| 8,851,954 B2 * | 10/2014 | McCafferty | A63H 1/30 446/250 |
| 8,879,135 B2 * | 11/2014 | Fehrer | G02B 7/1821 359/202.1 |
| 9,211,757 B2 * | 12/2015 | Osborne | B43K 23/001 |
| 9,440,157 B1 * | 9/2016 | Cai | A63H 1/30 |
| 9,764,176 B2 * | 9/2017 | Waterman | B01J 19/0046 |
| 9,895,620 B1 * | 2/2018 | Walterscheid | A63H 1/24 |
| 9,914,063 B1 * | 3/2018 | McCoskery | A63H 29/08 |
| 9,950,556 B1 * | 4/2018 | Laemle | B43K 29/00 |
| 10,016,693 B1 * | 7/2018 | Dowdy | A63H 33/003 |
| 2007/0023297 A1 * | 2/2007 | Schlattl | B65D 85/109 206/94 |
| 2007/0056872 A1 * | 3/2007 | Begim | B65D 73/0057 206/461 |
| 2013/0090583 A1 * | 4/2013 | Jung | A61H 15/00 601/131 |
| 2015/0217017 A1 | 8/2015 | Venisti | |
| 2017/0326468 A1 * | 11/2017 | Kinmont, Jr. | A63H 33/26 |
| 2018/0345156 A1 * | 12/2018 | Bornstein | A63H 1/20 |
| 2018/0353868 A1 * | 12/2018 | Albert | A63H 1/18 |
| 2019/0015757 A1 * | 1/2019 | Mak | A63H 1/00 |
| 2019/0029317 A1 * | 1/2019 | Velasquez | A24F 3/00 |

* cited by examiner

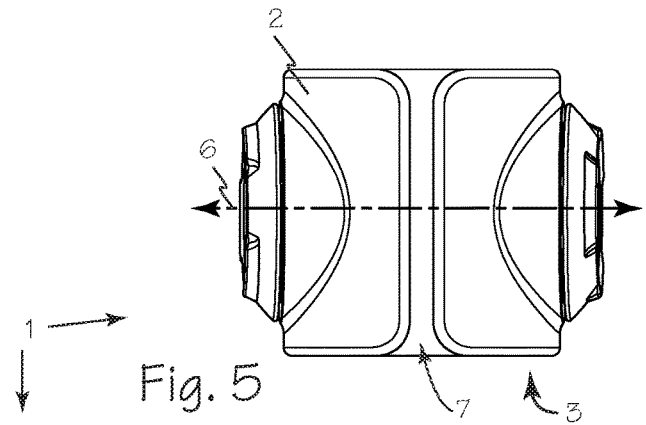
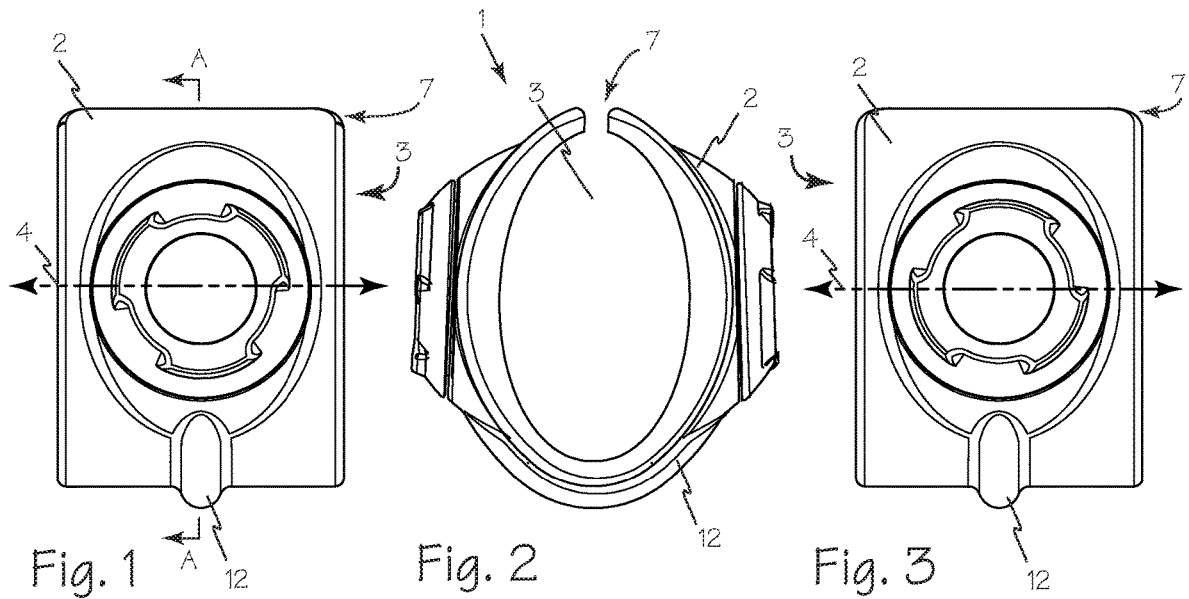
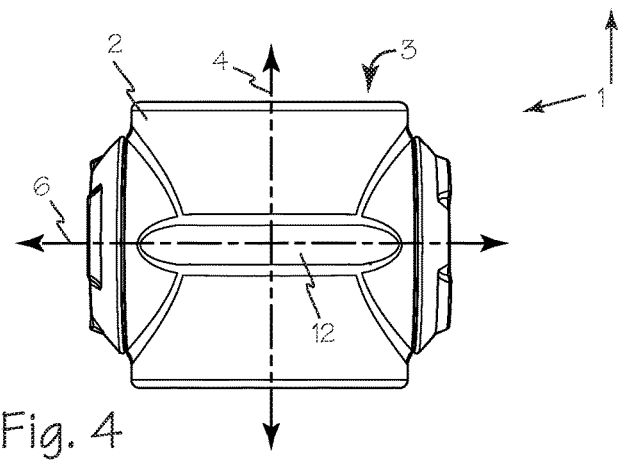

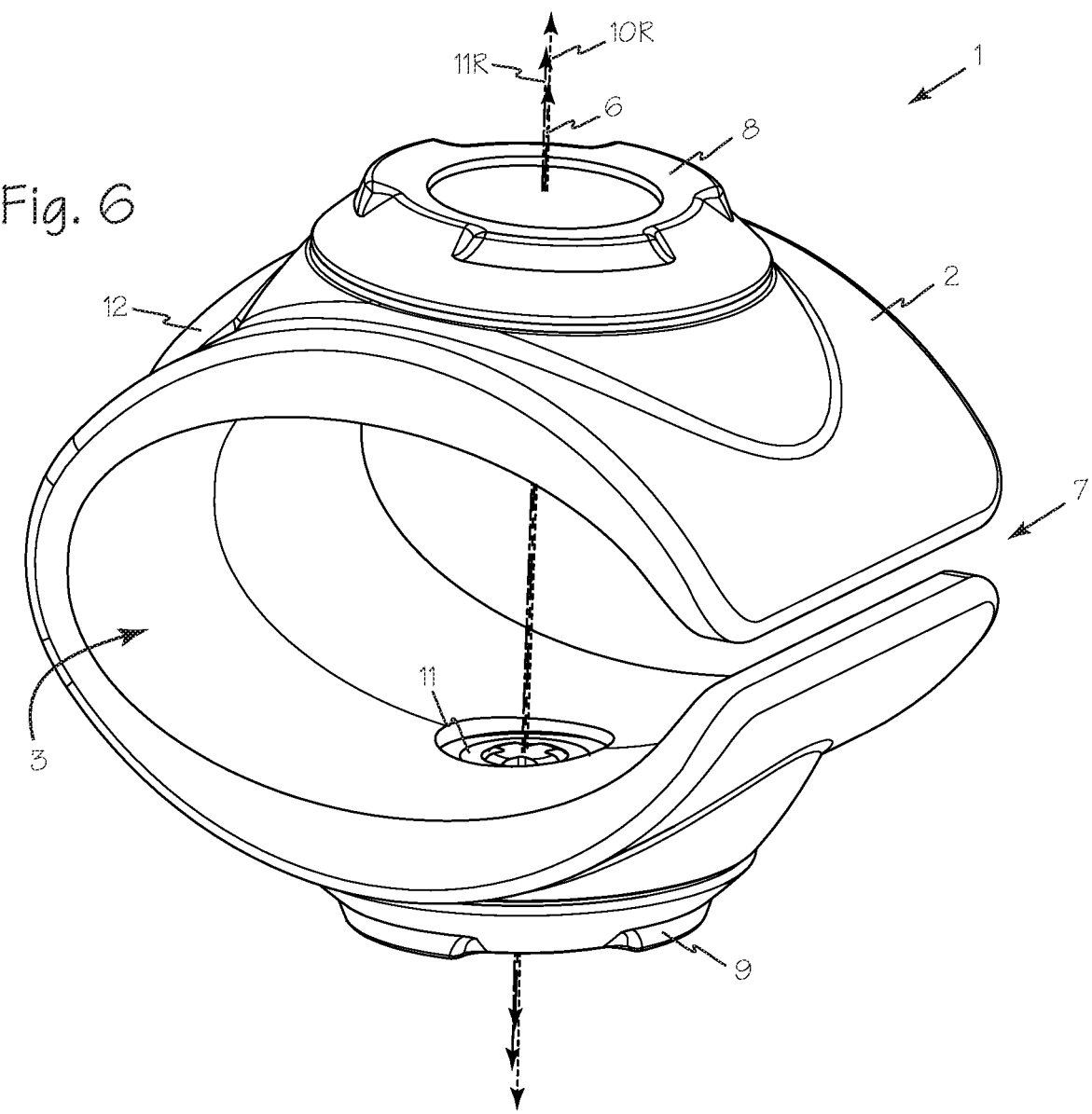

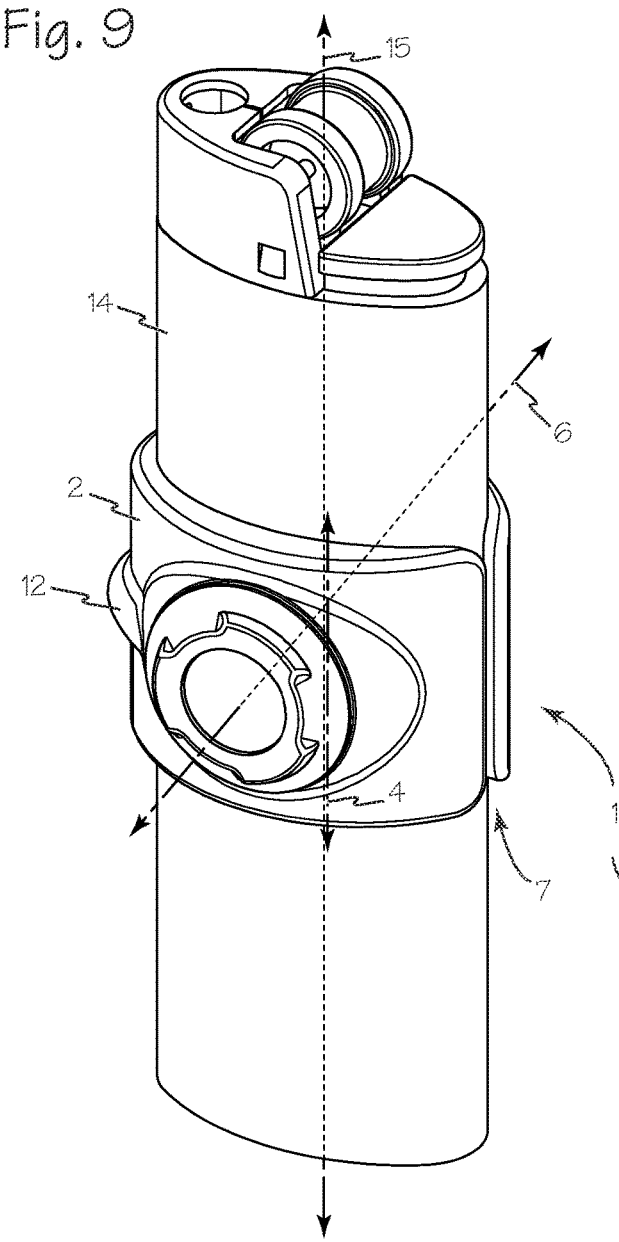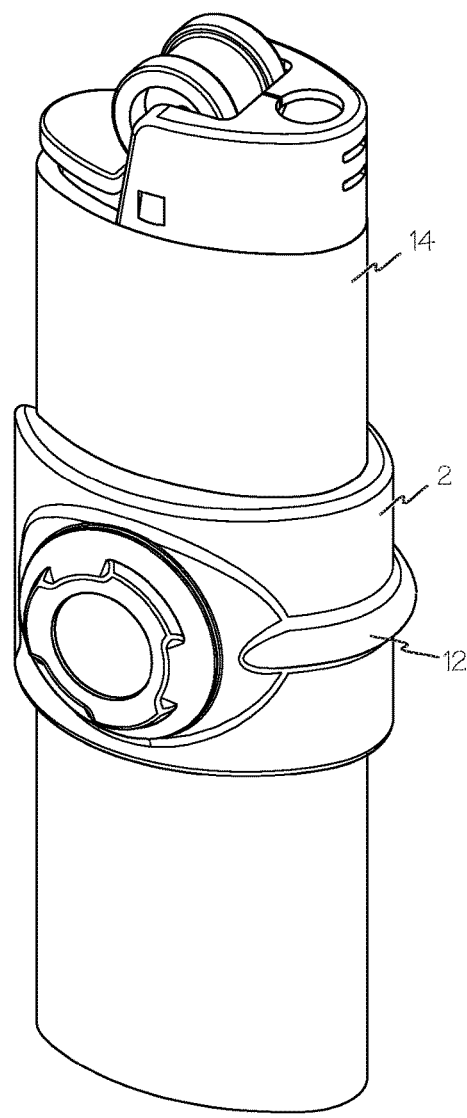

SPINNER COLLAR

This application claims priority to U.S. Provisional Application 62/567,656, filed Oct. 3, 2017.

FIELD OF THE INVENTIONS

The inventions described below relate to the field of tactile amusements such as spinners.

BACKGROUND OF THE INVENTIONS

Many people engage in tactile amusement by twirling or spinning pens, pencils and other devices.

SUMMARY

The devices and methods described below provide for a spinner collar to engage any suitable apparatus such as a lighter to enable the lighter to spin about the bearing axis of the spinner collar.

Devices such as lighters with a long axis may be engaged about the long axis by a spinner collar with the bore axis of the spinner collar parallel to the long axis of the lighter such that the bearing axis or axis of rotation of the spinner collar is perpendicular to the long axis of the device, and the bore axis of the spinner collar, enabling rotation of the long axis of the device about the axis of rotation of the spinner collar. Alternatively, the axis of rotation of the spinner collar may be oriented at any other suitable angle relative to the bore axis of the spinner collar.

BRIEF DESCRIPTION OF THE DRAWINGS

FIG. 1 is a front plan view of a spinner collar.
FIG. 2 is a top view of the spinner collar of FIG. 1.
FIG. 3 is a back plan view of the spinner collar of FIG. 1.
FIG. 4 is a left side view of the spinner collar of FIG. 1.
FIG. 5 is a right side view of the spinner collar of FIG. 1.
FIG. 6 is a perspective view of the spinner collar of FIG. 1.
FIG. 9 is a front perspective view of the spinner collar of FIG. 1 engaging a lighter.
FIG. 10 is a rear perspective view of the spinner collar of FIG. 1 engaging a lighter.

DETAILED DESCRIPTION OF THE INVENTIONS

Figure 7:
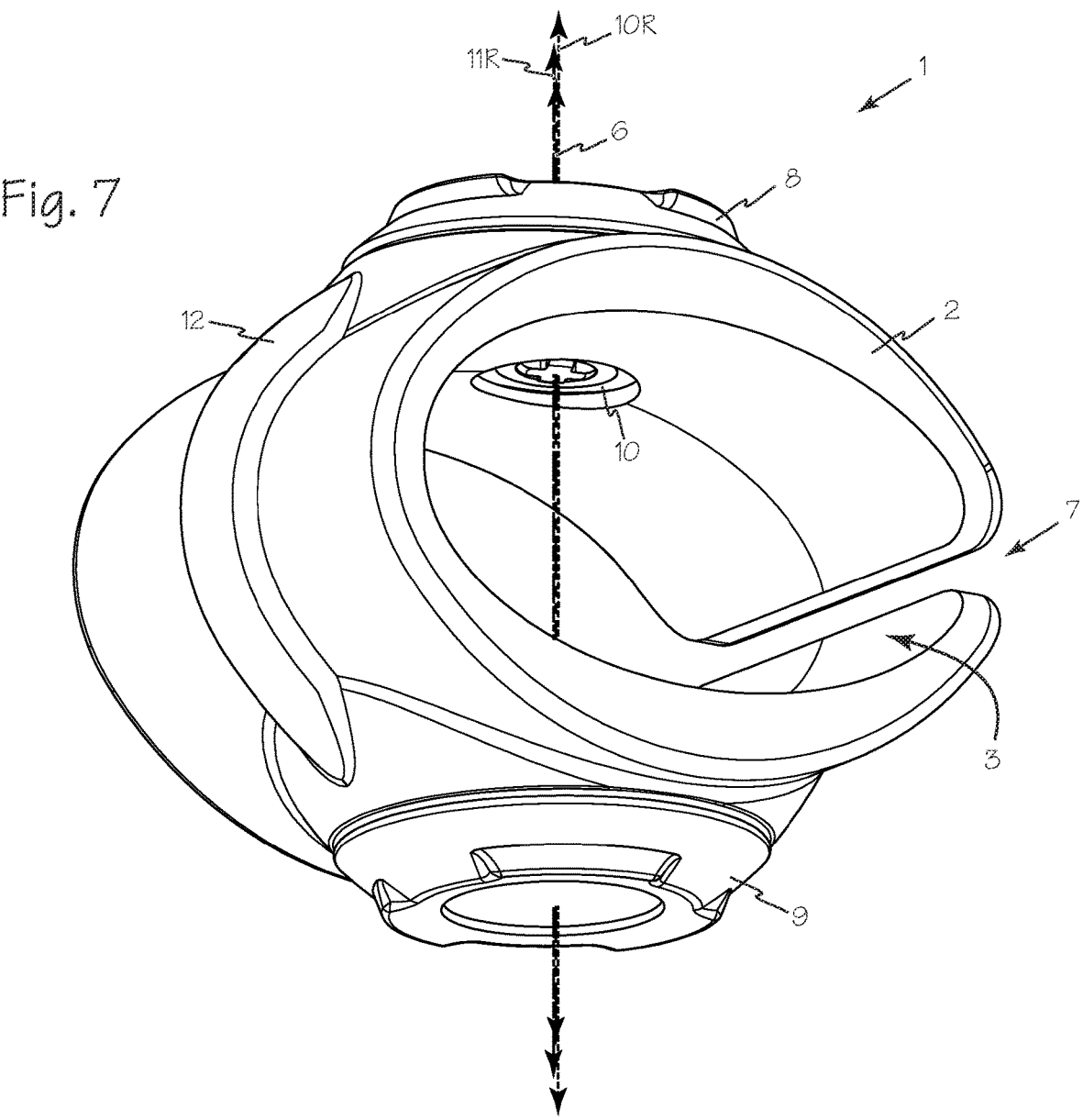
FIG. 7 is an alternate perspective view of the spinner collar of FIG. 1.

Spinner collar 1 of FIGS. 1 through 5 includes a collar 2 having a device bore 3 for engaging any suitable device such as a lighter. Device bore 3 has a bore axis 4 which is perpendicular to the collar axis of rotation 6 which is collinear with the axes of rotation of the bearings. Collar 2 includes slot 7 to enable collar 2 to flex sufficiently so that a device can be placed in bore 3 and the collar 2 will frictionally engage the device in bore 3. Collar 2 may also include a reinforcement rib 12.

Figure 8:
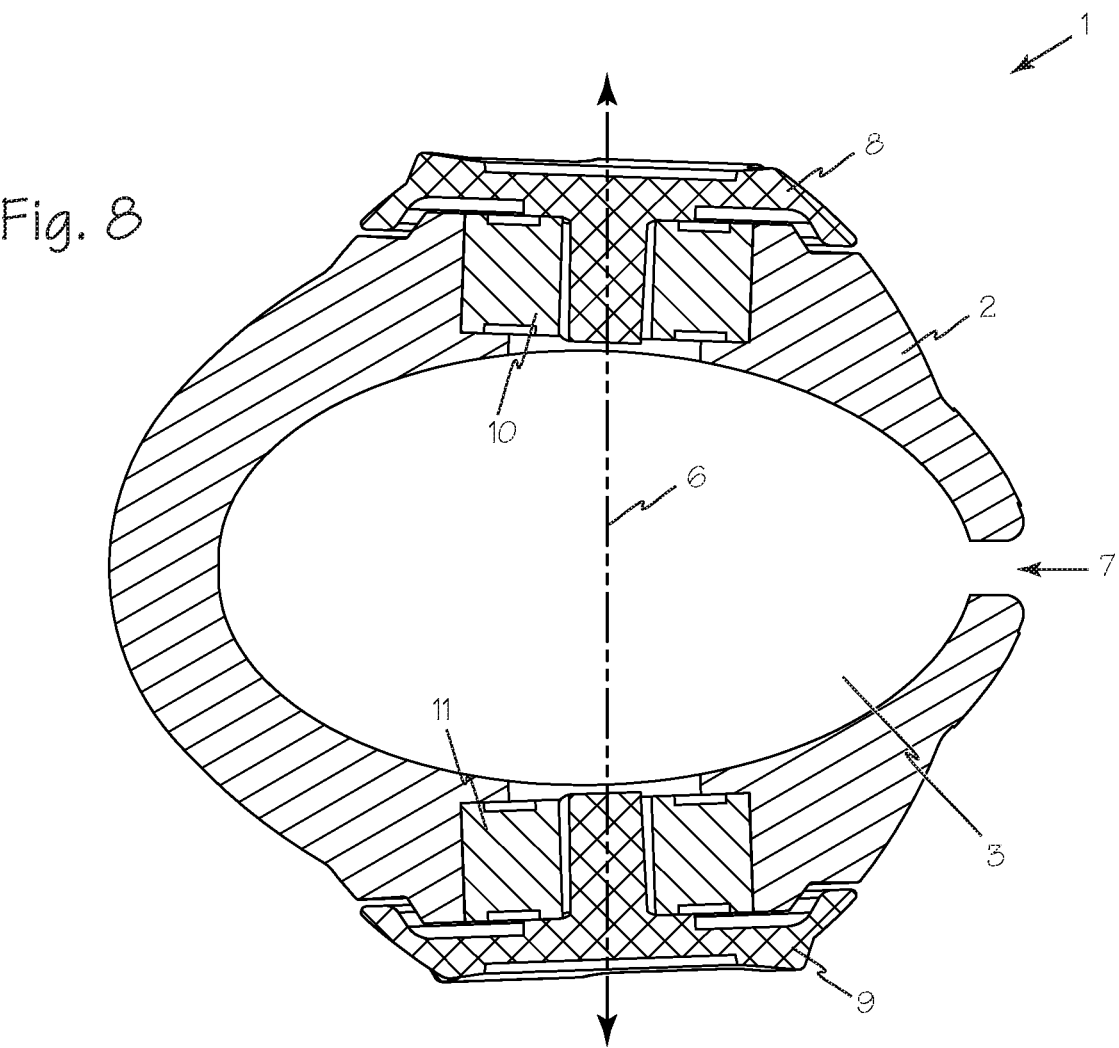
FIG. 8 is a cross-section view of the spinner collar of FIG. 1 taken along A-A.

Referring to FIGS. 6, 7 and 8, a first grip 8 engages a first bearing 10 and a second grip 9 engages a second bearing 11. First bearing 10 secures first grip 8 to collar 2 and second bearing 11 secures second grip 9 to collar 2 to enable grips 8 and 9 to rotate relative to collar 2. Bearings 10 and 11 are oriented with their axes of rotation, axes 10R and 11R respectively, nearly but not collinear with each other and the collar axis of rotation 6 when the spinner collar 1 is at rest with the bore 3 empty.

In use any suitable device such as lighter 14 is frictionally engaged in bore 3 of collar 2 with the long axis of the device, long axis 15 parallel to the bore axis 4 of the collar as illustrated in FIGS. 9 and 10. A first grip 8 and second grip 9 are engaged by a user, such as by engaging the first grip 8 and second grip 9 with opposing fingers of one of the user's hands. With the grips so engaged, bore axis 4 which corresponds to the long axis of the lighter may be rotated about the axis of rotation 6 of the collar.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A spinner collar comprising:
    a collar having a bore with a bore axis;
    a first grip engaging a first bearing which in turn engages the collar, the first bearing having an axis of rotation, the first grip engaging the first bearing in a manner so that as the first grip rotates relative to the first bearing about the axis of rotation of the first bearing, and the first grip and first bearing are blocked from moving relative to one another in a lateral direction perpendicular to the first bearing axis of rotation;
    a second grip engaging a second bearing which in turn engages the collar, the second bearing having an axis of rotation;
    a slot in the collar parallel to the bore axis, the collar being configured to selectively flex to accommodate and frictionally engage a device placed in the bore;
    wherein the axis of rotation of the first bearing and the axis of rotation of the second bearing are not collinear when the collar is not flexed wherein when the collar is flexed to accommodate a device placed in the bore, the collar is rotatable about an axis of rotation of the collar that is perpendicular to the bore axis and collinear with the axis of rotation of the first bearing and the axis of rotation of the second bearing.

2. The spinner collar of claim 1, wherein the collar further comprises:
    a reinforcement rib parallel to the axis of rotation of the collar and perpendicular to the bore axis.

3. The spinner collar of claim 1, wherein the first grip has a first grip surface that is perpendicular to the axis of rotation of the first bearing, the first grip surface being disposed on a side of the first bearing opposite the bore, and the second grip has a second grip surface that is perpendicular to the axis of rotation of the second bearing, and wherein the first grip surface is not parallel to the second grip surface when the collar is unflexed.

4. A spinner collar, comprising:
    a collar having a bore with a bore axis;
    a first bearing supported by the collar;
    a first grip rotationally supported by the first bearing and configured to rotate relative to the collar about a first axis of rotation, the first grip having a first grip surface that is perpendicular to the first axis of rotation, the first grip surface being disposed on a side of the first bearing opposite the bore;

a second bearing supported by the collar; and a second grip rotationally supported by the second bearing and configured to rotate relative to the collar about a second axis of rotation, the second grip having a second grip surface that is perpendicular to the second axis of rotation, the second grip surface being disposed on a side of the second bearing opposite the bore;

wherein the collar comprises a slot parallel to the bore axis and wherein the collar is configured to flex to accommodate a device in the bore in a manner so that the collar frictionally engages the device and the device rotates with the collar about the first grip and second grip and about a collar axis of rotation that is collinear with the first axis of rotation and the second axis of rotation; and wherein the first axis of rotation is not collinear with the second axis of rotation when the collar is not flexed.

5. The spinner collar of claim 4, wherein the collar is blocked from moving laterally relative to the first grip about the entirety of the first axis of rotation.

6. The spinner collar of claim 4, wherein the first axis of rotation is perpendicular to the bore axis and the second axis of rotation is perpendicular to the bore axis when the collar is not flexed.

7. The spinner collar of claim 6, wherein the first grip surface intersects and is contiguous across the first axis of rotation, and the second grip surface intersects and is contiguous across the second axis of rotation.

8. The spinner collar of claim 7, wherein the spinner collar is configured so that a user can simultaneously engage the first grip surface and the second grip surface with fingers of one hand.

9. The spinner collar of claim 4, wherein the collar defines a first cavity and a second cavity, and wherein the first bearing is received in the first cavity and the second bearing is received in the second cavity.

10. The spinner collar of claim 4, wherein the first axis of rotation and the second axis of rotation are not collinear with the collar axis of rotation when the collar is unflexed.

11. The spinner collar of claim 10, wherein the slot is equidistant from the first axis of rotation and the second axis of rotation.

12. The spinner collar of claim 10, wherein the first grip surface is not parallel to the second grip surface when the collar is unflexed.

13. A spinner collar, comprising:

a collar having a bore with a bore axis;

a first bearing having an outer wall, the first bearing supported by the collar and having a first bearing axis of rotation;

a first grip rotationally supported by the first bearing, the first grip positioned on a side of the first bearing radially outward from the bore axis, and the first grip and collar are blocked from moving laterally relative to one another about the entire circumference of the first grip;

a second bearing having an outer wall, the second bearing supported by the collar and having a second bearing axis of rotation;

a second grip rotationally supported by the second bearing, the second grip positioned on a side of the second bearing radially outward from the bore axis, and the second grip and collar are blocked from moving laterally relative to one another about the entire circumference of the second grip; and the collar comprising a slot parallel to the bore axis;

wherein the collar is configured to flex to accommodate a device in the bore in a manner so that the collar frictionally engages the device;

wherein the first bearing axis of rotation is not collinear with the second bearing axis of rotation when the collar is not flexed; and wherein the first and second grips, first and second bearings, and the collar are configured so that the collar rotates relative to the grips about a collar axis of rotation that is collinear with the first bearing axis of rotation and the second bearing axis of rotation when the collar is flexed to accommodate the device in the bore.

* * * * *